(12) United States Patent
Igarashi

(10) Patent No.: US 7,143,480 B2
(45) Date of Patent: Dec. 5, 2006

(54) FASTENER FOR ELONGATED MEMBER SUCH AS WIRE HARNESS

(75) Inventor: Kouichi Igarashi, Utsunomiya (JP)

(73) Assignee: Newfrey LLC, Newark, DE (US)

( * ) Notice: Subject to any disclaimer, the term of this patent is extended or adjusted under 35 U.S.C. 154(b) by 44 days.

(21) Appl. No.: 10/893,387

(22) Filed: Jul. 19, 2004

(65) Prior Publication Data
US 2005/0022344 A1    Feb. 3, 2005

(30) Foreign Application Priority Data
Jul. 28, 2003    (JP) .............................. 2003-202395

(51) Int. Cl.
*F16B 2/08* (2006.01)
(52) U.S. Cl. .................. 24/16 PB; 24/20 TT; 248/74.3
(58) Field of Classification Search .............. 24/20 TT, 24/16 R, 487, 16 PB, 543; 248/74.1–74.3
See application file for complete search history.

(56) References Cited

U.S. PATENT DOCUMENTS

| | | | |
|---|---|---|---|
| 5,367,750 A | 11/1994 | Ward | .............................. 24/16 |
| 5,906,342 A | 5/1999 | Kraus | .......................... 248/74.1 |
| 5,937,488 A | 8/1999 | Geiger | |
| 5,966,781 A | 10/1999 | Geiger | |
| 6,003,208 A * | 12/1999 | Christian et al. | ......... 24/16 PB |

FOREIGN PATENT DOCUMENTS

| | | |
|---|---|---|
| DE | 37 08 864 | 9/1988 |
| DE | 3844109 A1 * | 7/1990 |
| EP | 0 483 635 | 5/1992 |
| EP | 0 642 971 | 3/1995 |
| EP | 0 656 501 | 6/1995 |
| EP | 0 999 110 | 5/2000 |
| EP | 1 036 966 | 9/2000 |
| JP | 62-25307 | 2/1987 |
| JP | 7-4977 | 1/1995 |
| JP | 7-34283 | 6/1995 |
| JP | 942517 | 1/1996 |

* cited by examiner

Primary Examiner—James R. Brittain
(74) Attorney, Agent, or Firm—Miles & Stockbridge P.C.

(57) ABSTRACT

A fastener 1 comprises a base unit 5 for holding a portion of the outer circumferential surface of a member 3; an arm 13, a first end of which is connected by a hinge to a first end of the base unit, and curved so as to form, in cooperation with the base unit, a loop for holding the elongated member; a base unit-side engagement part 19 at a second end of the base unit; an arm-side engagement part 15, deployed at a second end of the arm, for engaging the base unit-side engagement part so as to form the base unit and the arm into a loop; a first pressing piece 29, hinged to the first end of the arm; and a second pressing piece 34, hinged to the second end of the base unit. Stops 37, 38 are formed on the arm for preventing the first pressing piece 29 from moving in the axial direction of the member.

2 Claims, 7 Drawing Sheets

FASTENER FOR ELONGATED MEMBER SUCH AS WIRE HARNESS

CROSS-REFERENCE TO RELATED APPLICATION

This application claims the benefit of Japanese Patent Application No. 2003-202395 filed Jul. 28, 2003, incorporated herein by reference.

BACKGROUND OF THE INVENTION

The present invention relates to a fastener for enclosing and holding the outer circumferential surface of an elongated member such as a wire harness, and capable of being used for attaching such a member to a support.

Fasteners comprising a base unit for making contact with and holding the outer circumferential surface of elongated members such as wire harnesses or pipe, and an arm, hinged to the base unit, having an engagement part for engaging a corresponding engagement part in the base unit provided at the free end, and curved so as to form a loop in cooperation with the base unit when engaged to the base unit engagement part, are known. See, for example, Laid-Open Utility Model Application No. H7-34283/1995, gazette publication (Patent Literature 1). This fastener comprises: a base unit for holding a portion of the outer circumferential surface of the member; an arm, a first end of which is hinged to a first end of the base unit, curved so as to form, in cooperation with the base unit, a loop for holding the member; a base unit-side engagement part deployed at a second end of the base unit; and an arm-side engagement part, deployed at a second end of the arm, for engaging the base unit-side engagement part so as to form the base unit and the arm into the loop. A first pressing piece is hinged to the first end of the arm so as to extend toward the second end of the arm, and a second pressing piece is hinged to the second end of the base unit so as to extend from the base unit. The tip of the second pressing piece enters in between the arm and the first pressing piece when the base unit-side engagement part has engaged the arm-side engagement part. The first pressing piece and the second pressing piece cooperate to fill in the gap between the member and the arm.

Accordingly, advantages are realized in that, even if the member, such as a wire harness, is small in diameter, the superimposed thickness of the two pressing pieces increases to fill in the gap between the arm and the member, so that the member can be firmly held, and the insertion length (stroke) required to insert the arm-side engagement part into the base unit-side engagement part can be minimal, as with a large-diameter member, and the length of the arm-side engagement part can be short.

In addition to the fastener described above, fasteners which can hold wire harnesses of different outer diameters, are disclosed in Laid-Open Utility Model Application No. S62-25307/1987, gazette publication (Patent Literature 2) and the No. 1 gazette publication similar to Design Registration No. 942517 (Patent Literature 3). In the fasteners in Patent Literature 2 and 3, no innovative mechanism is provided for filling in the gap between the arm and the member when a member such as a wire harness is of small diameter, so that the advantages seen in Patent Literature 1 are not obtained. Laid-Open Utility Model Application No. H7-4977/1995, gazette publication (Patent Literature 4) discloses a clip which can attach an elongated member such as a wire harness to a headed stud or so-called T stud. This clip has a long band and a band fastener for holding an elongated member, and is configured such that the outer circumferential surface of the member is enclosed with the band, which is passed through the band fastener and tightened down to hold the member. This clip, while avoiding a gap between the band and the member, requires a long band, and the advantages seen in Patent Literature 1 are not obtained.

As stated in the foregoing, the fastener in Patent Literature 1 is preferable to the fasteners or clip in Patent Literature 2 to 4 because it provides advantages, namely, that it can firmly hold a member such as a wire harness, that the insertion length required to insert the arm-side engagement part into the base unit-side engagement part can be minimal as with a large-diameter member, and that the length of the arm-side engagement part can be short. Nevertheless, even with the fastener of Patent Literature 1, when a force is applied tending to move the fastener in the axial direction relative to the elongated member, the first pressing piece that is directly pressing against the member will be dragged by that force, and there is a danger that the hinge part connected to the arm will break, and, if it breaks, there is a danger of the holding force declining.

BRIEF DESCRIPTION OF THE INVENTION

Accordingly, an object of the present invention is to improve a fastener in which a curved arm is hinged to a base unit, the base unit and the arm form a loop for enclosing the outer circumferential surface of an elongated member, such as a wire harness, when a base unit-side engagement part is engaged with an arm-side engagement part, and in which a second pressing piece enters into the gap between the arm and a first pressing piece. A more particular object is to provide a fastener that can maintain high holding force even if the first pressing piece is acted on by a force in the axial direction and its hinge is damaged.

The invention uses a fastener for a wire harness or the like which encloses the outer circumferential surface of an elongated member such as a wire harness, and that comprises: a base unit for holding a portion of the outer circumferential surface of the member; an arm, a first end of which is hinged to a first end of the base unit, curved so as to form, in cooperation with the base unit, a loop for holding the elongated member; a base unit-engagement part, at the second end of the base unit; an arm-side engagement part, at the second end of the arm, for engaging the base unit-side engagement part so as to form the base unit and the arm into a loop; a first pressing piece, hinged to the first end of the arm so as to extend toward the second end of the arm, and a second pressing piece, hinged to the second end of the base unit so as to extend from the base unit. A tip of the second pressing piece enters in between the arm and the first pressing piece when the base unit-side engagement part has engaged the arm-side engagement part, and the first pressing piece and the second pressing piece cooperate to fill in the gap between the member and the arm. One or more stops formed on the arm prevent the first pressing piece from moving in the axial direction of the member.

As described above, movement of the first pressing piece in the axial direction of the member is restricted by one or more stops. Therefore, even if the fastener moves relative to the member, the shear force acting on the hinge which forms the connection of the first pressing piece to the arm will be diminished and damage will be lessened. Moreover, even if the hinge is damaged, the first pressing piece is supported by the arm, so that high holding force is maintained.

In the fastener described above, it is preferable that the stops be formed as a plurality of protrusions that project inwardly in the radial direction at intervals along the side edges of the arm. The stops should preferably engage the second pressing piece and prevent movement of the second pressing piece in the axial direction of the member, so that movement in the axial direction of the second pressing piece can also be restricted and a high holding force maintained. It is also preferable that an attaching device be provided on the base unit for attaching the elongated member to a support. For example, on the base unit, a band and band fastener attaching device may be provided for attachment of the fastener to an elongated support such as a pipe, or a headed attaching device can be provided for insertion into an attachment hole.

BRIEF DESCRIPTION OF THE DRAWINGS

The invention will be further described in conjunction with the accompanying drawings, which illustrate preferred (best mode) embodiments of the invention, and wherein.

DETAILED DESCRIPTION OF THE INVENTION

Figure 1:
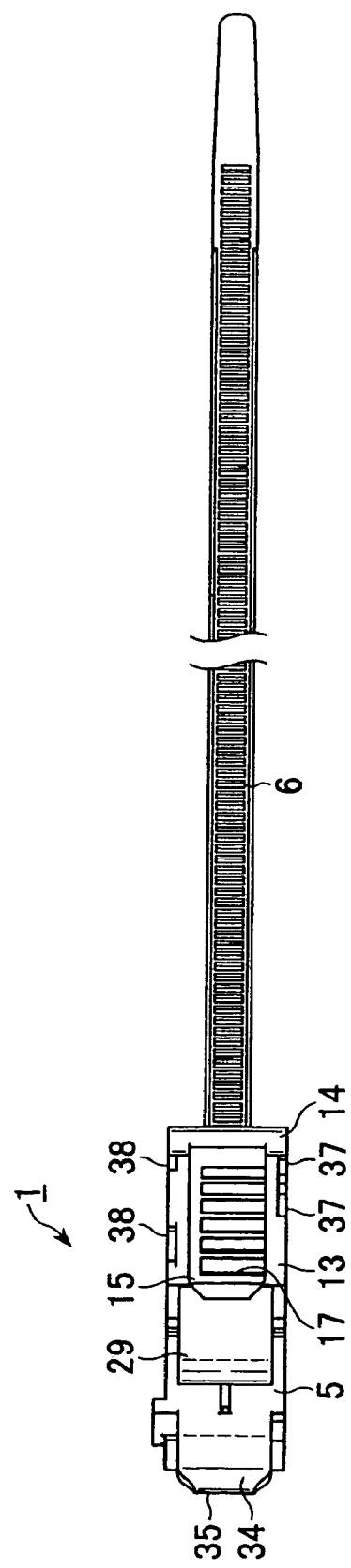
FIG. 1 is a plan view of a fastener for a wire harness or the like relating to a first embodiment of the present invention.

Embodiments of the present invention will now be described with reference to the drawings.

FIGS. 1 to 4 show a fastener 1, for an elongated member such as a wire harness, relating to a first embodiment of the present invention. The fastener 1 is preferably formed as an integral molded plastic product, having a base unit 5, curved so as to hold a wire harness, for example, and make contact with a portion of the outer circumferential surface of the wire harness. To the base unit 5, a band 6 and band fastener 7 are provided as a device for attaching this fastener to the pipe 2, for example. The structure and function of such a band 6 and band fastener 7 are well known, being described, for example, in Patent Literature 4 (Laid-Open Utility Model Application No. H7-4977/1995, gazette publication), which may be referred to for any further description thereof. The attaching device made up of the band and band fastener, moreover, constitutes only one example of a device for attaching the fastener 1 to a support. As another example, the fastener 1 can be attached to a screw stud secured to a panel. A further example will be described in conjunction with a second embodiment of the invention. The attaching device is not mandatory, moreover, and may be omitted. On the side edges of the base unit 5, on the back side thereof (i.e. the side which the band fastener 7 is on), one or more ribs are formed to reinforce the base unit 5.

The fastener 1 has an arm 13 formed with a curve to match the wire harness, the first end 11 of which is hinged by a first hinge 10 to the first end 9 of the base unit 5. At the second end 14, that constitutes the free end of the arm 13, is formed a flexible band-shaped arm-side engagement part 15 as an extension of the arm 13. Multiple sawtooth-shaped engaging teeth 17 are formed in the length dimension of the arm-side engagement part 15. At the second end 18 of the base unit 5, i.e., at the opposite extremity from the first end 9, is provided a base unit-side engagement part 19, which has an engagement pawl 22 and a hole 21 for accepting the arm-side engagement part 15, for engaging the engaging teeth 17 of the arm-side engagement part 15. The arm 13 curves so as to form a loop, in cooperation with the base unit 5, for enclosing the wire harness when the arm-side engagement part 15 is engaged with the base unit-side engagement part 19.

The arm-side engagement part 15 extends from the second end 14 of the arm 13 in elongated fashion as a flexible band of smaller width than the arm, and has a plurality of sawtooth-shaped engaging teeth 17 provided on a surface thereof. The base unit-side engagement part 19 has the hole 21 (see FIG. 4) for accepting the arm-side engagement part 15. In this hole 21 is provided the engagement pawl 22 for engaging one of the engaging teeth 17 in the arm-side engagement part 15. A finger-manipulated part 23 is provided for releasing the engagement pawl 22. Accordingly, if the arm-side engagement part 15 is inserted into the hole 21 in the base unit-side engagement part 19, one of the engaging teeth 17 will engage the engagement pawl 22, whereupon the base unit 5 and arm 13 will cooperate to form a loop, and hold the wire harness inside that loop. To release that engagement, the finger-manipulated part 23 is pressed downward, in FIG. 4, and the engagement pawl 22 will separate from the engaging teeth 17, so that the arm-side engagement part 15 can be disengaged from the base unit-side engagement part 19. Furthermore, a finger-manipulated part that doubles as a stop 25 is formed at the second end 14 of the arm 13 for making the loop smaller so as to match the diameter of the wire harness and prevent further size reduction of the loop, after the arm-side engagement part 15 has been inserted into the base unit-side engagement part 19. A rib 26 (see FIG. 2) is formed on the outer circumferential surface of the arm 13 to reinforce the entire arm 13.

At the first end 11 of the arm 13 adjacent to the first hinge 10, a second hinge 27 is formed of thin material. A first pressing piece 29 extends along the arm 13 from second hinge 27 toward the second end 14, which is the free end of the arm, or even toward the arm-side engagement part 15. The first pressing piece 29, which is positioned between the arm 13 and the wire harness when the arm 13 is holding the wire harness, is formed of a flexible and elastic material, and can be flexed to match the wire harness being held. The first pressing piece 29 can move pivotally relative to the arm 13 by virtue of the second hinge 27, the base of which is of thin material. The tip 30 of the first pressing piece 29 curves toward the base unit 5. On the surface of the first pressing piece 29, near the tip thereof, a rib 31 is formed that bites into the wire harness being held, to ensure wire harness holding.

In the base unit 5, at the second end 18 adjacent to the base unit-side engagement part 19, a third hinge 33 is formed of thin material. A second pressing piece 34 extends from the third hinge 33. The second pressing piece 34 extends so as to enter in between the arm 13 and the first pressing piece 29 when the arm-side engagement part 15 of the arm 13 is engaged in the base unit-side engagement part 19 of the base unit 5 to form a loop. The second pressing piece 34 is also formed of a flexible and elastic material, and can be flexed to match the wire harness being held. The third hinge 33, that is the base portion of the second pressing piece 34, is made so that the second pressing piece 34 can pivot. The second pressing piece 34 is formed such that the portion adjacent to the third hinge 33 is thick, but is tapered so as to become gradually thinner toward the tip, being formed so that the superimposed thickness of the two pressing pieces will increase as the diameter of the wire harness becomes smaller. Furthermore, a tip part 35 (see FIG. 1) is formed as a guide of smaller width for insuring entry between the arm 13 and the first pressing piece 29 when a loop is formed for the wire harness body by the arm 13 and the base unit 5.

Figure 2:
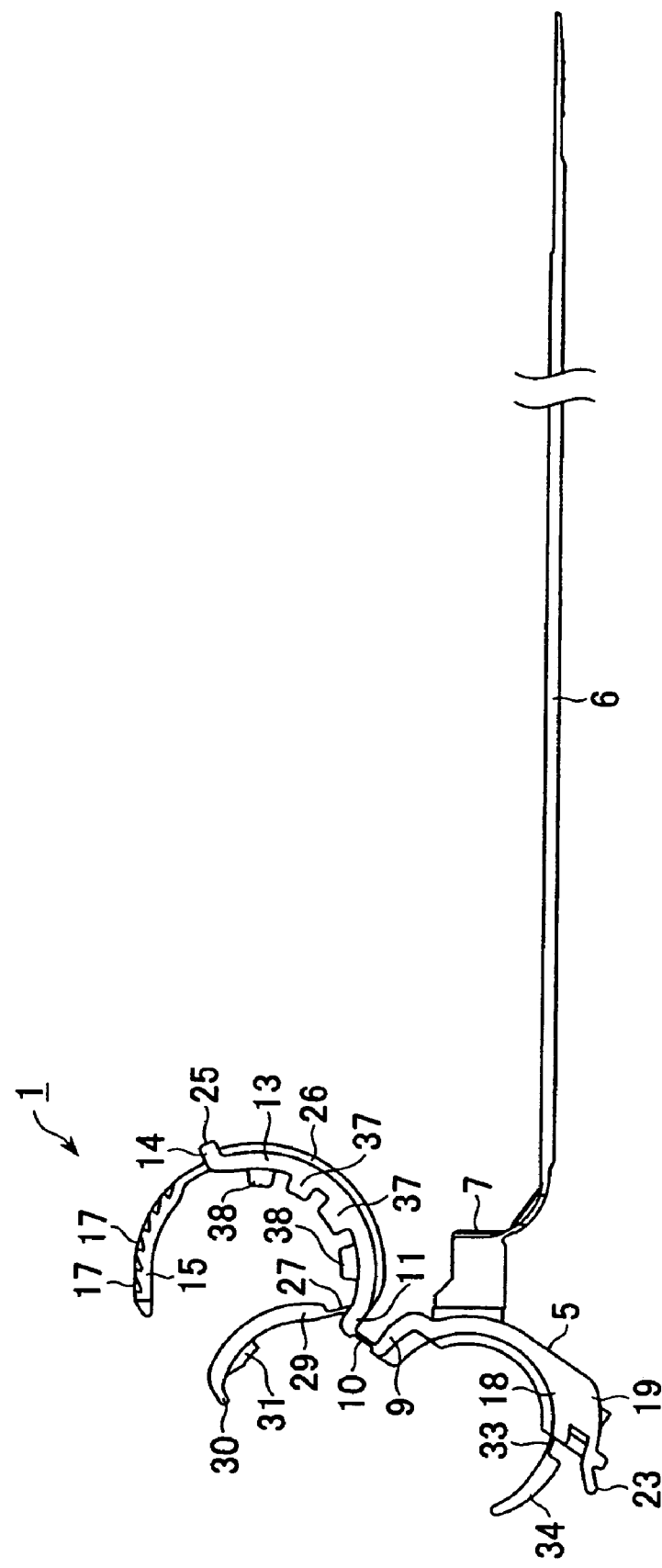
FIG. 2 is a front elevation view of the fastener shown in FIG. 1.
Figure 3:
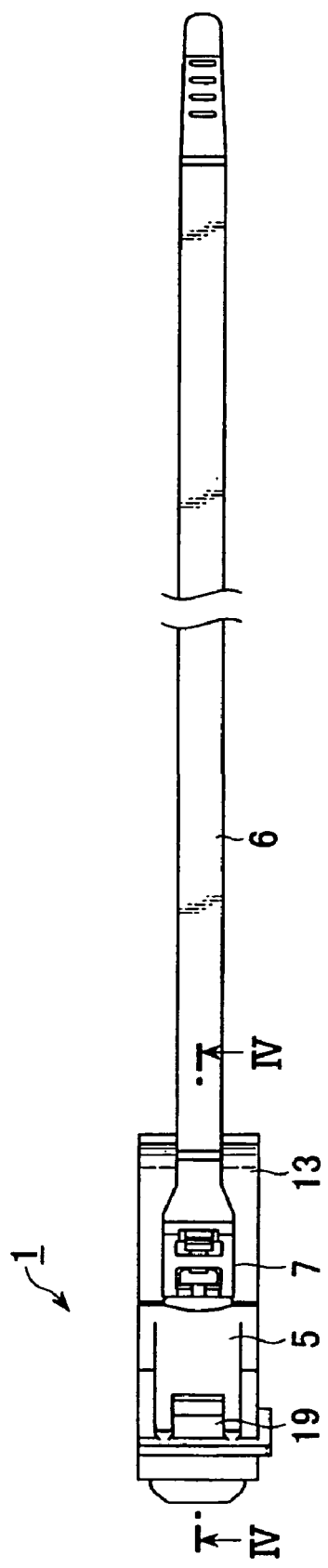
FIG. 3 is an underside plan view of the fastener shown in FIG. 1.
Figure 4:
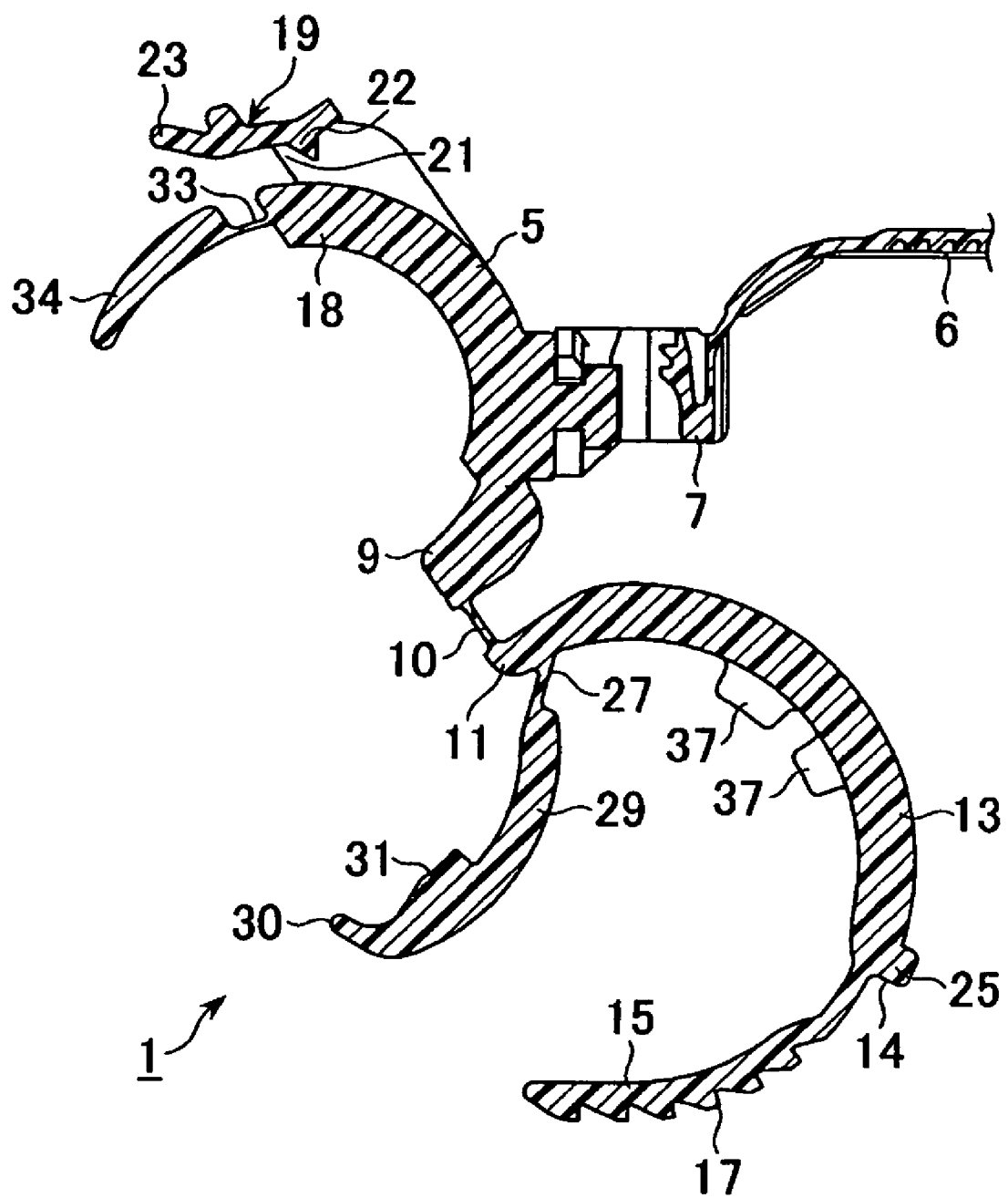
FIG. 4 is a section in the IV—IV plane of the fastener shown in FIG. 3.

On the arm 13, stops 37 and 38 (see FIGS. 1, 2 and 4) are formed to prevent the first pressing piece 29 from moving in the axial direction of the wire harness. The stops 37 and 38 are formed as a plurality of protrusions that project inwardly in the radial direction at intervals along the side edges of the arm. As shown in FIGS. 1, 2 and 4, the stops 37 are formed as two wall-shaped protrusions that project toward the first pressing piece 29 at an interval on one side edge of the arm 13, while the stops 38 are formed as two wall-shaped protrusions that project toward the first pressing piece 29 at an interval on the other side edge of the arm 13. If a force acts on the first pressing piece 29 in the axial direction relative to the wire harness, the stops 37 and 38 will restrict the movement of the first pressing piece 29 in the axial direction. Accordingly, even if there is relative movement in the axial direction between the wire harness and the fastener 1, the first pressing piece 29 will be prevented from moving in the axial direction relative to the arm 13 (and the base unit 5), so that any shear force against the second hinge 27, which is the connecting part for the first pressing piece 29, will be diminished. Thereby, damage to the second hinge 27 is lessened, and, even if there is damage, the first pressing piece 29 will be supported by the arm 13, and a high holding force will be maintained. The stops 37 and 38 preferably comprise protrusions (such as the stops 38 on the side of the arm 13 near the second end 14, for example) which engage the second pressing piece 34 in addition to engaging the first pressing piece 29, and prevent movement of the second pressing piece 34 in the axial direction of the wire harness. Thereby, the movement in the axial direction of the second pressing piece can also be restricted, and a high holding force will be maintained. The stops, moreover, are not limited to the two side surfaces of the arm 13, so long as they are formed on the arm 13 in a manner that prevents movement of the first pressing piece in the axial direction of the wire harness 3 (i.e., of the elongated member). The stops may be projecting ridges formed in the center of the arm 13, for example, or may be a channel that accepts the first pressing piece 29.

Figure 5:
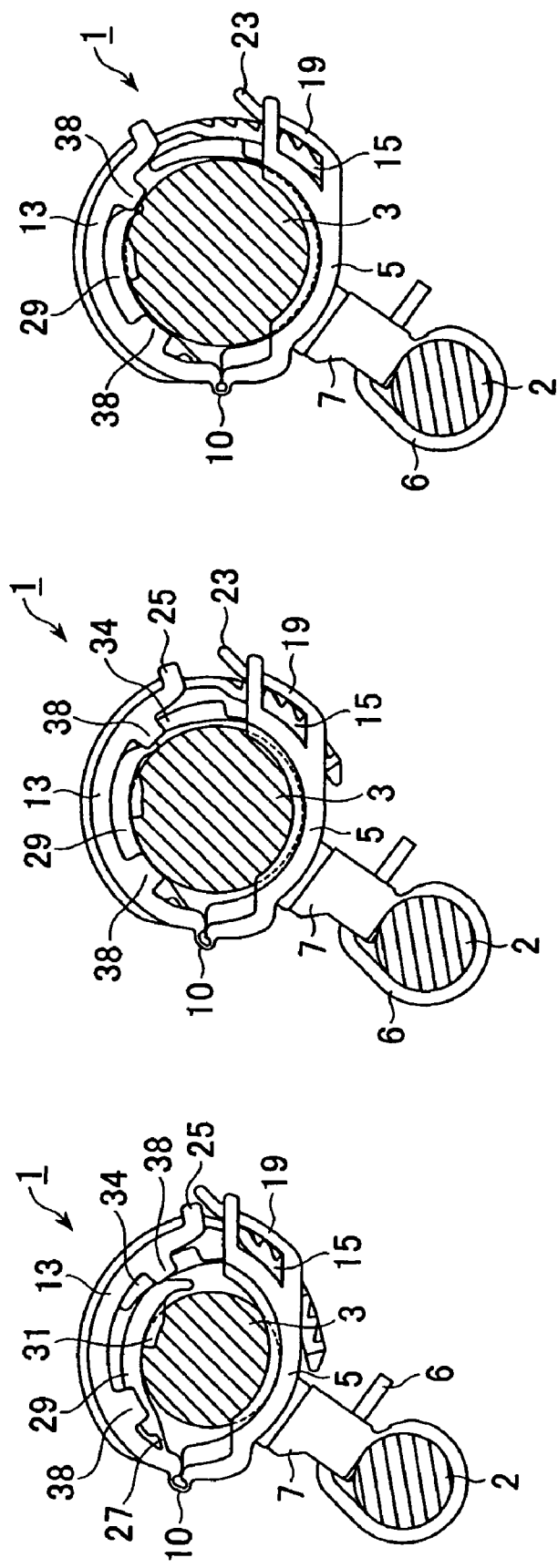
FIGS. 5(A)–(C) show how the fastener shown in FIG. 1 is used, wherein a wire harness of small diameter is held as shown in (A), a wire harness of intermediate diameter is held as shown in (B), and a wire harness of large diameter is held as shown in (C)
Figure 6:
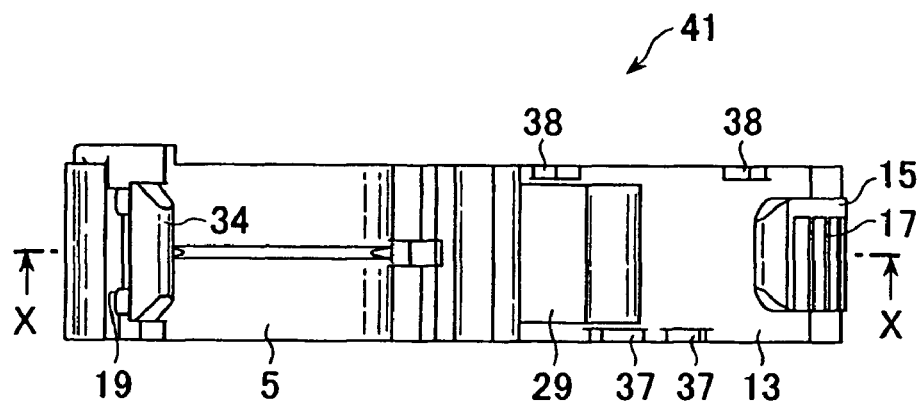
FIG. 6 is a plan view of a fastener for a wire harness or the like relating to a second embodiment of the present invention.
Figure 7:
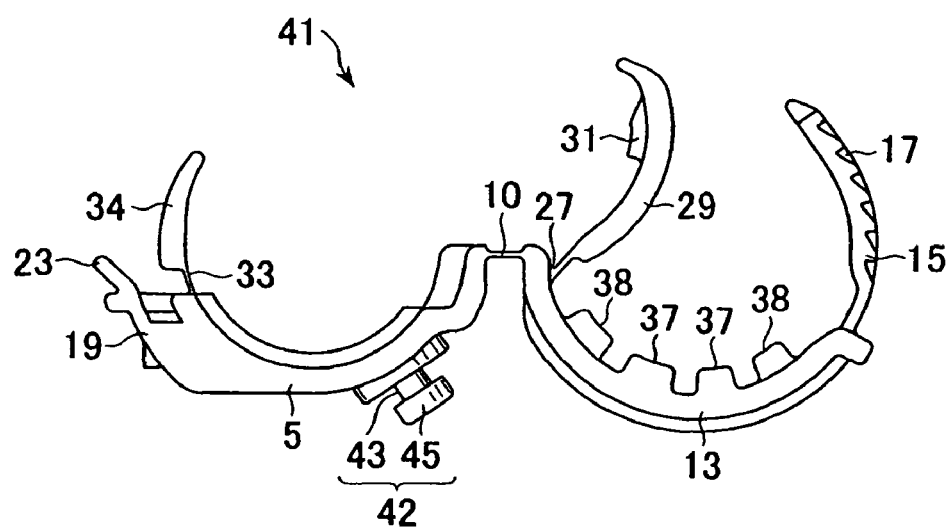
FIG. 7 is a front elevation view of the fastener shown in FIG. 6.
Figure 8:
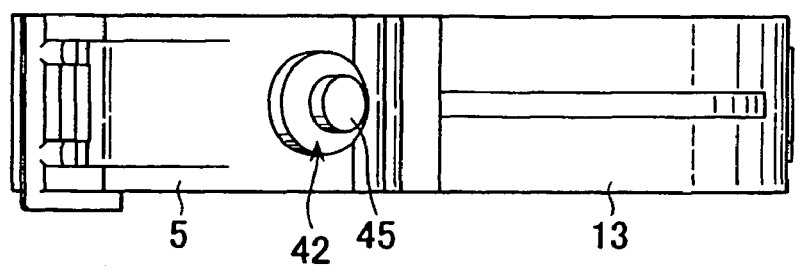
FIG. 8 is an underside plan view of the fastener shown in FIG. 6.
Figure 9A:
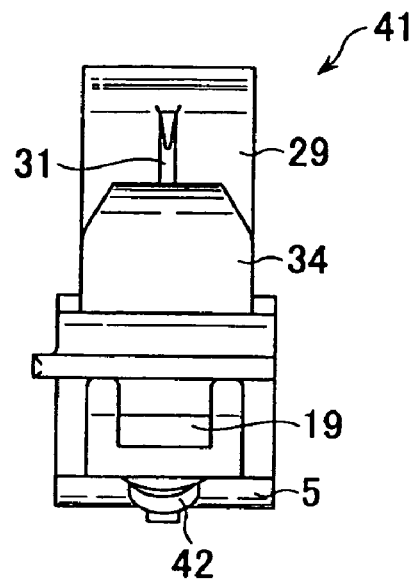
FIG. 9(A) is a left side elevation view of the fastener shown in FIG. 6
Figure 9B:
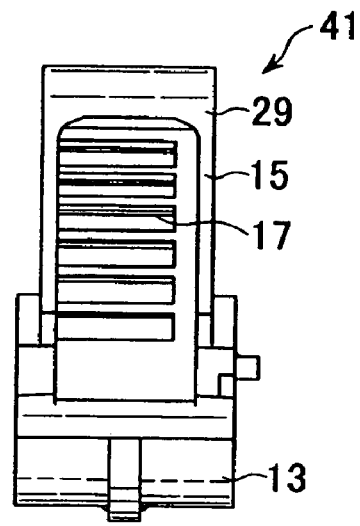
FIG. 9(B) is a right side elevation view of the fastener shown in FIG. 6.
Figure 10:
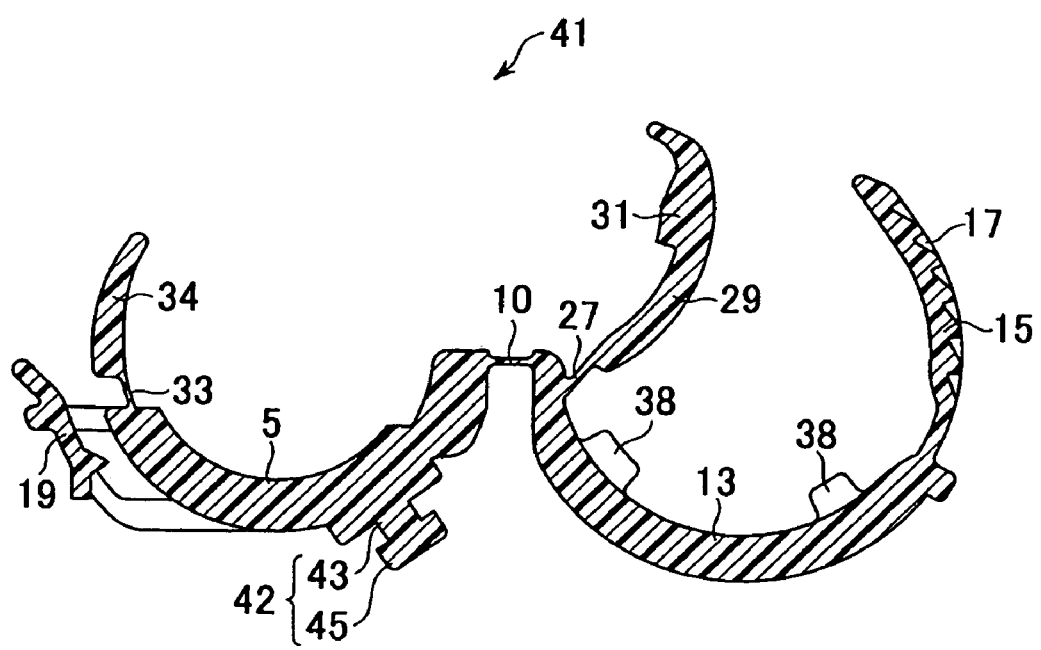
FIG. 10 is a section in the X-X plane of the fastener shown in FIG. 6.

The operation of holding the wire harness 3 with the fastener 1 will now be described with reference to FIGS. 5(A)–(C). In FIG. 5(B), either the wire harness 3 or the base unit 5 of the fastener 1 is put into a position at which the wire harness 3 is held by the base unit 5; the arm 13 is turned about the first hinge 10; and the arm-side engagement part 15 is inserted into the hole 21 in the base unit-side engagement part 19. Then, when the finger-manipulated part that doubles as a stop 25 of the arm 13 is pressed with a finger and the arm-side engagement part 15 is firmly pushed into the base unit-side engagement part 19, the multistage engaging teeth 17 in the arm-side engagement part 15 are engaged by the engagement pawl of the base unit-side engagement part 19 at the optimal place, and a condition is maintained wherein the wire harness 3 is strongly held.

As described already, the first pressing piece 29 extends along the arm 13, and the second pressing piece 34 is deployed so as to extend from the base unit 5, so that the first pressing piece 29 is interposed between the arm 13 and the wire harness 3, and the second pressing piece 34 is interposed between the arm-side engagement part 15 of the arm 13 and the wire harness 3. The tip end portion of the second pressing piece 34 enters in between the arm 13 and the tip end portion of the first pressing piece 29 to become superimposed with the first pressing piece 29. The length of this superimposition between the first pressing piece 29 and the second pressing piece 34 will depend on how large or small is the diameter of the wire harness 3 being held. With a wire harness 3 of small diameter as indicated in FIG. 5(A), the superimposition length will be longer, while with a wire harness 3 of large diameter as in FIG. 5(C), the superimposition length will be shorter or there will be no superimposition. As shown in FIGS. 5(A) to 5(C), even if the wire harness 3 is of small diameter, the superimposed thickness of the two pressing pieces 29 and 34 will increase to fill up the gap between the arm 13 and the wire harness 3, so that the wire harness 3 can be firmly held. In this tight holding, the rib 31 on the inside of the first pressing piece 29 bites into the outer surface of the wire harness 3 and makes the holding even stronger.

As described above, the length of the superimposition when the second pressing piece 34 enters in between the arm 13 and the first pressing piece 29 will be short if the wire harness is of large diameter as in FIG. 5(C), and longer if the wire harness is of small diameter as in FIG. 5(A). The length of the superimposition between the two pressing pieces increases as the diameter of the wire harness becomes smaller. The amount by which the arm-side engagement part 15 is inserted into the base unit-side engagement part 19 will exhibit almost no change even if the diameter of the wire harness 3 changes. In other words, the length by which the arm-side engagement part 15 is inserted into the base unit-side engagement part 19 (i.e. the stroke) need be only minimal, in like manner, whether the wire harness is of large diameter or small diameter. As a consequence, the length of the arm-side engagement part can be short.

When the wire harness 3 is to be attached to a pipe 2, as shown in FIGS. 5(A) to 5(C), all that need be done is to pass the band 6 through the band fastener 7 and tighten it to attach the base unit 5 to the pipe 2. In cases where the attachment force to the pipe 2 is insufficient, a plurality of fasteners 1 can be provided at prescribed intervals on the wire harness 3. After attachment in this manner, or prior to attachment to the pipe 2, the fastener 1 may tend to move relative to the wire harness 3, in the axial direction of the wire harness 3. If such movement occurred, the first pressing piece 29 in contact with the outer surface of the wire harness 3, would be dragged in the axial direction relative to the arm 13. There is a danger that the second hinge 27 may be damaged by such dragging of the first pressing piece 29, but, as already described, a plurality of stops 37 and 38 formed on the side edges of the arm 13 prevent the first pressing piece 29 from being dragged. Thus, even if there is relative movement in the axial direction between the wire harness 3 and the fastener 1, the first pressing piece 29 will be prevented from moving in the axial direction relative to the arm 13 (and the base unit 5), so that any shear force against the second hinge 27, which is the connecting part for the first pressing piece 29, will be diminished. Thereby, damage to the second hinge 27 is reduced, and even if there is damage, the first pressing piece 29 will be supported by the arm 13, and high holding force will be maintained. As shown in FIGS. 5(A) and 5(B), the stops 38 engage the second pressing piece 34, in addition to the first pressing piece 29, to prevent the second pressing piece 34 from moving in the axial direction of the wire harness. Thereby, movement of the second pressing piece 34 in the axial direction can be restricted, and high holding force maintained.

In order to remove the wire harness 3 from the fastener 1, it is only necessary to press the finger-manipulated part 23 of the base unit-side engagement part 19 with a finger, release the engagement of the engaging teeth 17 of the arm-side engagement part 15, pull the arm-side engagement part 15 away from the base unit-side engagement part 19, and turn the arm 13 so that it opens.

FIGS. 6 to 10 show a fastener 41 relating to a second embodiment of the present invention. This fastener 41 has almost the same configuration as the fastener 1 of the first embodiment. What is different is that, in this second embodiment, the device for attaching a wire harness (as an elongated member) to a support comprises a headed attaching part 42 which can be inserted into an attachment hole in the support. Otherwise, the configuration is the same as it is in the fastener 1. Accordingly, the same symbols are used as for fastener 1 and any further description is omitted. The headed part 42 comprises a shaft 43 which extends from the base unit 5, and a large-diameter head 45 at the tip thereof, and can be attached in a keyhole-shaped attachment hole in a panel which is the support, for example.

In the fastener of the present invention, for elongated members such as wire harnesses, the gap between the arm and the base unit is eliminated, a wire harness can be firmly held, and the amount of insertion of the arm-side engagement part into the base unit-side engagement part can be minimal. Also, even if the fastener moves relative to the support, any shear force against the hinge which is the connecting part for the first pressing piece will be diminished and damage lessened. Even if the hinge is damaged, the first pressing piece will be supported by the arm and high holding force will be maintained.

While preferred embodiments of the invention have been shown and described, it will be apparent that changes can be made without departing from the principles and spirit of the invention, the scope of which is defined in the following claims.

What is claimed is:

1. A fastener for enclosing an outer circumferential surface of an elongated member such as a wire harness, comprising:
a base unit for holding a portion of the outer circumferential surface of said member; an arm, a first end of which is hinged to a first end of said base unit, and curved so as to form, in cooperation with said base unit, a loop for holding said elongated member; a base unit-side engagement part at a second end of said base unit; an arm-side engagement part at a second end of said arm, for engaging said base unit-side engagement part so as to form said base unit and said arm into said loop; a first pressing piece, hinged to said first end of said arm; and a second pressing piece, hinged to said second end of said base unit, so that a tip of said second pressing piece enters in between said arm and said first pressing piece when said base unit-side engagement part has engaged said arm-side engagement part and so that said first pressing piece and said second pressing piece cooperate to fill in a gap between said member and said arm; and at least one stop on said arm constructed and disposed to prevent said first pressing piece from moving in an axial direction of said member, wherein there are a plurality of protrusions forming stops that project inward in the radial direction at intervals along the side edges of said arm, and
wherein said protrusions engage said second pressing piece and prevent said second pressing piece from moving in the axial direction of said member.

2. The fastener recited in claim 1, further comprising an attaching device on said base unit for attaching said elongated member to a support.

* * * * *